FIP8102 XR 3,100,283 X 3
CROSS REFERENCE [redacted]
331-47 (2) 230
Caldwell
Aug. 6, 1963 D. M. MAKOW 3,100,283
CA 11-22-58 PULSE GROUP GENERATING AND SHAPING CIRCUIT 843991
Filed Oct. 2, 1959 4 Sheets-Sheet 1
FIG. 1 "Self-quenching self triggering blocking o
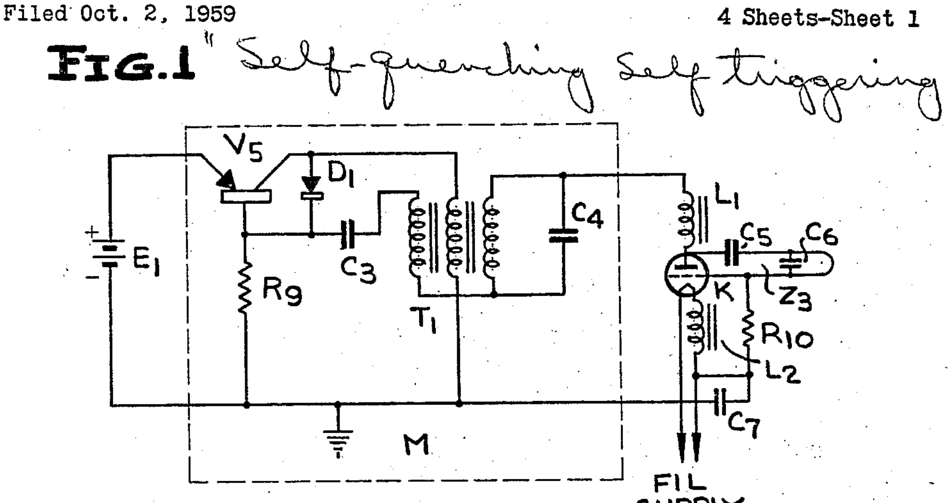
PRIOR ART
FIG. 2
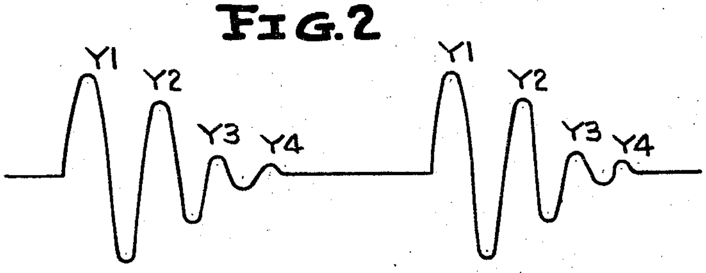
FIG. 3
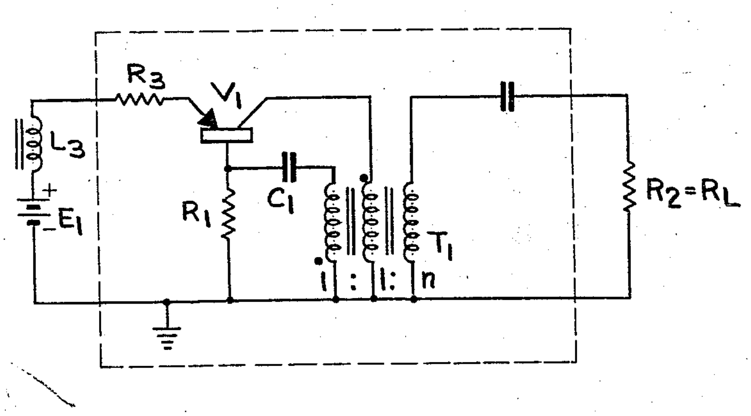
INVENTOR
DAVID MARK MAKOW
BY Stevens, Davis, Miller & Mosher
ATTORNEYS INVENTOR
DAVID MARK MAKOW
BY Stevens, Davis, Miller & Mosher
ATTORNEYS

INVENTOR
DAVID MARK MAKOW

BY Stevens, Davis, Miller & Mosher
ATTORNEYS

Aug. 6, 1963 D. M. MAKOW 3,100,283

PULSE GROUP GENERATING AND SHAPING CIRCUIT

Filed Oct. 2, 1959 4 Sheets-Sheet 4

INVENTOR

DAVID MARK MAKOW

BY Stevens, Davis, Miller & Mosher

ATTORNEY 3,100,283

PULSE GROUP GENERATING AND SHAPING CIRCUIT

David Mark Makow, P.O. Box 458, R.R. 1, Ottawa, Ontario, Canada

Filed Oct. 2, 1959, Ser. No. 843,991
Claims priority, application Canada Nov. 22, 1958
8 Claims. (Cl. 331—47)

The present invention relates to a self-quenching self-triggering blocking oscillator for generating spaced groups or trains of pulses of at least two pulses each, which also includes means for controlling the shape of the pulses and is particularly concerned with such a circuit in its transistorized form when used as the plate modulation circuit of a mobile transmitter.

A plate modulation circuit of the same general type as the present invention was disclosed in previously filed application No. 686,110, which was filed in the name of H. L. R. Smyth et al. for "Electronic Control Circuit," on September 25, 1957, now Patent No. 3,022,418.

The basic problem to which a solution is propounded by the present invention is the need for a simple reliable light-weight pulse generator of low power consumption whose output comprises spaced trains of pulses of controllable width and interpulse spacing, with each train comprising only a few pulses in number, and the interval between pulse trains being relatively large compared with the time occupied by the pulse train.

Though such circuits obviously have a general application they are of particular value when used as the plate modulation circuit for a mobile radio frequency transmitter where reliability, low weight, and low power consumption are prime requisites. One specific use of such transmitters is as a distress beacon for emitting groups of pulses periodically on which searching aircraft, ships, etc. can home. Here the need for reliability becomes a matter of life and death and the lower the power consumption, the longer the transmitter will continue to operate and thus the greater the chances of detection of a missing craft.

The present circuit has been devised specifically for employment in the plate modulation circuit of the distress transmitter to be used in conjunction with the "Crash Position Indicator for Aircraft," described by Harry T. Stevinson in his Canadian Patent No. 575,533, issued May 12, 1959. When employed in this capacity the output of the circuit may usefully consist of four pulses of high peak amplitude with the pulse groups recurring at approximately 65 cycles per second, that is to say, that the pulse groups spaced about 15 milliseconds apart, the pulses themselves being approximately 7 microseconds wide and the interpulse interval about 70 microseconds.

Other solutions have been propounded to this problem one of which is the use of a first blocking oscillator generating the plate modulation pulses at a high prf which is switched on and off by second switching blocking oscillator of low recurrence frequency which opens the first blocking oscillator long enough for it to generate the required number of pulses and then switches it off again. This circuit is inferior to the present circuit in that it requires two blocking oscillators each of which could thus affect the reliability of the system and also of course the weight and power consumption are increased by virtue of these two units. Though the present invention uses a particular form of blocking oscillator it only uses one such oscillator with a minimum number of components. In particular the number of pulses in the train, the spacing between the pulses and the pulse train repetition frequency have been found to be very stable with moderate changes in loading and supply voltage and also have proven themselves to be stable with changes in temperature from −40° C. to +50° C.

Another known technique is the use of a delay line to control the interpulse interval. Reliability so far as the number of pulses is concerned is not a strong point of this type of circuit and the number of components and their individual cost is quite high so that weight and cost are up and reliability is down.

Yet another known circuit employs an L–C–R network and this type is employed in a similar crash position indicator, but is not suitable where plate modulation is required as its pulses are not of sufficient amplitude for such purposes.

In the above noted previously filed application No. 686,118 a transistorized blocking oscillator circuit was disclosed which included, in the output from the tertiary winding of the blocking oscillator transformer, a "ringing capacitor" whose function it was, when the blocking oscillator pulsed uniquely, to produce ringing in the output winding which though heavily damped gave an output of approximately 2 pulses of sufficient amplitude to provide plate modulation for the distress transmitter oscillator. The drawbacks of this circuit were that no positive control could be exercised over the number of pulses and also, since the output pulses were produced by a ringing action, the output wave form was of a generally sinusoidal nature so that the pulse width was approximately half the interpulse interval. Pulses formed in this manner were found to be too long but since the receiving equipment dictated the interpulse interval and the pulse width was in turn linked to the pulse interval, no corrective action could be taken with this type of circuit. This earlier circuit was also more easily affected by loading and temperature variations than the present circuit. The present invention discloses a circuit which is an improved blocking oscillator circuit, in which the interpulse interval and the pulse width can be controlled independently and also the pulse group recurrent frequency can be readily varied by means of a simple preset component.

A pulse generating and shaping circuit when formed according to the present invention may be used to provide space pulse trains of at least two pulses per train which are to be applied to a user circuit having a principally resistive input impedance, the circuit comprising a self-quenching self-triggering blocking oscillator including a blocking oscillator transformer having an output winding across the terminals whereof said pulse trains are generated; a pulse shaping capacitor connected in series with said output winding and said input impedance, the value of said capacitor being such as to cause said capacitor to charge rapidly when charging current flows in said user circuit; and a discharge resistor connected to said pulse shaping capacitor whereby to discharge said pulse shaping capacitor rapidly when a discharging current flows in said user circuit.

The term "self-quenching self-triggering blocking oscillator" is here employed to mean a self-triggering blocking oscillator which does not shut itself off or "block" in the usual fashion of blocking oscillators after generating only one unique pulse during each blocking cycle, but instead generates several pulses before the blocking action occurs. Such blocking action is preferably achieved by the use of a blocking capacitor connected to the control electrode of the transistor or electron tube used, i.e. to the base or grid respectively, which capacitor receives a given charge during the conducting portion of each of the oscillations forming the pulse train until a sufficient charge has accumulated on the capacitor to shut off or "block" the oscillator. This capacitor then discharges through a discharge resistor suitably connected to it until sufficient charge has dissipated to cause the oscillations to start again, when the pulse train is repeated.

The pulse shaping capacitor connected between the blocking oscillator output and the user circuit may have its discharge path provided by a discharge resistor connected either in parallel with the input impedance of the user circuit, or across the capacitor itself. The overall effect is the same though as will be seen later the particular mechanics of the operation differ somewhat in each case.

As mentioned above a preferred user circuit is the oscillator of a mobile transmitter, such as a distress transmitter, and when this is so, the circuit of the present invention is preferably employed as the plate modulation circuit for the transmitter, and the input impedance of the user circuit is the plate circuit of the transmitter oscillator.

The following description relates to a preferred embodiment of the present invention namely that described above where the circuit is used for the plate modulation of the oscillator of a distress transmitter for a crash position indicator for aircraft etc., but it should be noted that description of this particular embodiment is given by way of illustration and not of limitation on the breadth of protection sought for the present invention. Rather the scope and spirit of the invention should be construed in accordance with the claims at the end of the specification.

Alternative embodiments could be formed, for example, by adapting the blocking oscillator circuits shown on page 124 of "Transistor Circuits and Applications," published by the McGraw-Hill Company, and it will be noted that included in the circuits therein depicted are circuits having the blocking capacitor connected to a different electrode than in the following preferred embodiment, and also different battery connections are shown. Both of these variations are essentially modifications of a basic transistor blocking oscillator circuit which could be adapted for use in the present invention, and expedients of this nature are considered to be within the scope of the present invention.

Of the drawings forming part of this description;

FIGURE 1 shows the circuit disclosed in the previously filed application referred to above in which the pulse train is formed by a "ringing"action in the output winding of the blocking oscillator transformer;

FIGURE 2 shows a typical pulse train formed by such a circuit;

FIGURE 3 shows a typical circuit for the present invention in which the load impedance is generally denoted by a resistor;

Figure 4:
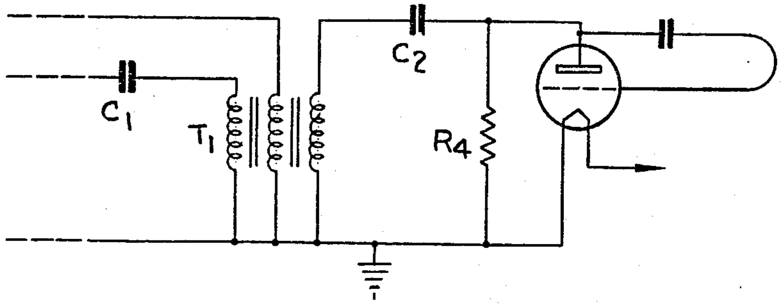
FIGURE 4 shows the output portion of the circuit of FIGURE 3 with the load being illustrated as a transmitter oscillator and the discharge resistor being connected across this oscillator.

Since the present circuit is related to that previously disclosed in the earlier filed application No. 686,110 it is considered advisable to give a short description of this circuit and the manner in which it differs from the present circuit before proceeding to a description of the preferred embodiment of the present invention. This earlier circuit is preferably formed as shown in FIGURE 1. As mentioned in the previous specification the earlier circuit comprises the blocking oscillator M formed by the blocking oscillator transformer $T_1$, a transistor $V_5$, a base capacitor $C_3$, a base resistor $R_9$ and a diode $D_1$ to provide a D.C. current path. The battery source $E_1$ of approximately 16 volts has one pole connected to the emitter of the transistor $V_5$, which is generally a pnp transistor so that the positive pole of the battery $E_1$ is connected to the emitter. The base of the transistor is connected via a base resistor $R_9$ to the other pole of the battery $E_1$, which may conveniently be grounded. From the base also a connection is made via a base capacitor $C_3$ to the primary winding of the blocking oscillator transformer $T_1$ the other side of this primary winding being connected in common with one side of the secondary and tertiary windings to the grounded pole of the battery $E_1$. The other side of the secondary winding is connected to the collector of $V_5$ and between the collector and base of $V_5$ a unilateral direct current path is provided by the diode $D_1$. The output winding of the transformer $T_1$ is connected to the load shown in this case as a triode oscillator. Across this output or tertiary winding is connected a "ringing" capacitor $C_4$ which is responsible for the formation of a group of pulses rather than a single pulse from the blocking oscillator.

The load, shown as a triode oscillator, is a conventional tuned plate parallel-line oscillator operating in the VHF band which consists of the triode $V_6$ between whose plate and grid is connected a parallel-line tuned circuit $Z_2$, the plate connection having in it a blocking capacitor $C_5$. Fine tuning is effected by means of capacitor $C_6$ across the ends of the parallel line and radio frequency isolation is achieved by chokes $L_1$ and $L_3$ in the plate and cathode leads respectively. Filtering is achieved by capacitor $C_7$ and the grid resistor is shown as resistor $R_{10}$ between the grid and one cathode lead.

The operation of the circuit of FIGURE 1 is that the presence of the capacitor $C_4$ causes the output circuit to "ring" so that instead of the unique pulse normally obtained from such a blocking oscillator circuit there are two or more pulses present in the output. The ringing is caused by the connection of a capacitive reactance element in one winding and since all of the windings are inductively coupled the same effect could be achieved by introducing a capacitive reactance into either of the other two windings or even with certain transformers this reactance could simply be the interwinding capacitance. The basic requirement is that a capacitor in some form or other be connected to one of the windings so that "ringing" is produced.

Typical pulses are shown in FIGURE 2 as pulses $Y_1$, $Y_2$, $Y_3$ and $Y_4$, the only two of any appreciable amplitude being the first two, namely pulses $Y_1$ and $Y_2$, $Y_3$ and $Y_4$ being so damped as to be incapable of modulating the triode oscillator. Thus it will be seen that this earlier circuit relies on "ringing" for its operation which was found to mean in practice that only two pulses could usefully be obtained and that the width of these pulses was dependent upon the transformer and the ringing capacitor and could not be readily controlled independently, particularly since the interval between pulses is pre-ordained by the associated receiver equipment and since the pulse wave form is generally sinusoidal the pulse width must be half the pulse interval. The circuit now disclosed permits more pulses to be formed with separate control of their width without having resort to any more complicated circuitry.

The circuit formed as a preferred embodiment of the present invention is shown in FIGURE 3. The connections here so far as the blocking oscillator of the circuit is concerned are similar to those shown in FIGURE 1. As before the three windings of the blocking oscillator transformer $T_1$ are connected in common at one end to ground, with the other end of the feedback winding being connected via the blocking capacitor $C_1$ to the base of the transistor $V_1$ and the other end of the input winding being connected directly to the collector of transistor $V_1$. The base of the transistor $V_1$ is connected to ground via a first discharge resistor $R_1$ and the emitter is connected to one pole of the battery $E_1$, shown here as the positive pole where the transistor $V_1$ is a pnp junction transistor. The other pole of the battery is connected to ground. In addition a resistive choke has been introduced into the emitter lead in series with the battery and for the sake of convenience this choke has been shown as two separate components, an ideal inductance $L_3$ and the resistive component shown as a resistor $R_3$, though of course in practice there is only one component namely a resistive choke.

A pulse shaping capacitor $C_2$ is connected in series with the output or tertiary winding of the blocking oscillator transformer. The purpose of this capacitor is as will be shown later different from that of the ringing capacitor in the previously disclosed circuit and another important criterion is that this capacitor must be provided with a discharge path having a short time constant. This path has been shown in general form in FIGURE 3 as a resistor $R_2$, in series with the output winding and the capacitor $C_2$, which may be considered as analogous to the input impedance of the load $R_L$. This input impedance is shown as a resistor since as will be appreciated from the following description, it must be principally a resistive impedance, though some reactance may be present.

One means of providing such a discharge path for the preferred distress transmitter embodiment of the present invention is shown in FIGURE 4 which shows the output portion of FIGURE 3 wherein the load impedance is illustrated as a symbolic oscillator triode which, as will be seen later, does not provide the desired discharge path which is therefore supplied by means of a resistor $R_4$ connected in parallel with the oscillator triode.

Figure 5:
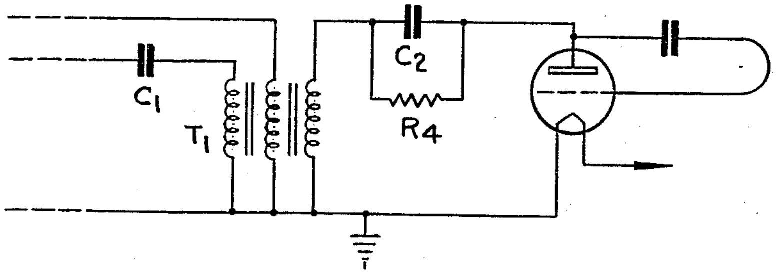
FIGURE 5 shows a similar configuration to that of FIGURE 4 except that the discharge resistor is now connected across the pulse shaping capacitor.

An alternative expedient is shown in FIGURE 5 where the resistor $R_4$ is connected instead across capacitor $C_2$ itself.

Figure 7:
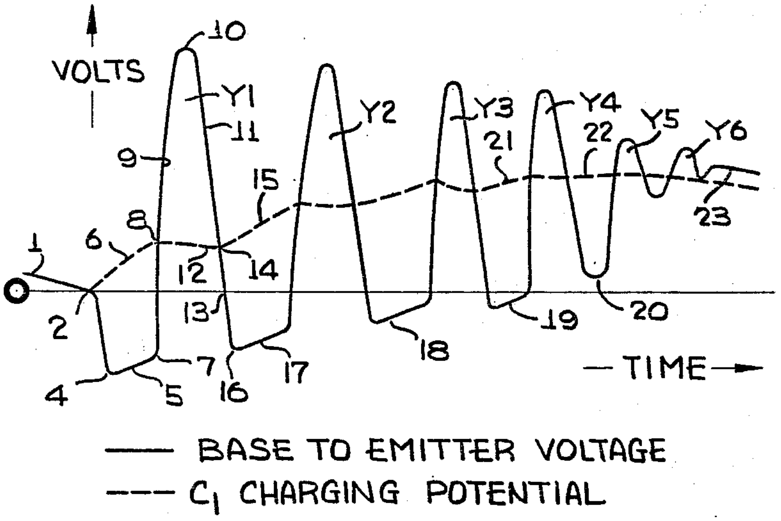
FIGURE 7 shows in curves A and B the emitter to base voltage, and the blocking capacitor charging potential.

The operation of the circuit will now be described in connection with FIGURES 7 and 8. FIGURE 7 shows two wave forms superimposed on one another for convenience in explanation. The first wave form is the base to emitter voltage of the transistor $V_1$ and this is shown by a solid line of curve A. The other wave form shows the charging potential which is built up across blocking capacitor $C_1$ and this is shown by the dashed line B.

The operation of the circuit is best understood by considering that $V_1$ is a pnp transistor and the blocking capacitor $C_1$ has on it a sufficient charge so that the base of transistor $V_1$ is slightly positive with respect to the emitter. Since $V_1$ is a pnp transistor this means that the transistor is shut off and current cannot flow into or out of $C_1$ through the transistor emitter-base path. Accordingly no current flows from the collector of transistor $V_1$ and there is no output from th eblocking oscillator.

and there is no output from the blocking oscillator.

positive with respect to the emitter, the emitter with respect to ground is at the positive potential of the battery $E_1$, so that capacitor $C_1$ must be charged to such a value that the base, with respect to ground, is several volts in excess of the battery potential. Capacitor $C_1$ is discharging through discharge resistor $R_1$ so that the base is gradually becoming more negative with respect to the emitter as the capacitor discharges.

These are the conditions prevailing in the portion 1 of curve A of FIGURE 7 which represents the base to emitter voltage. The reference line for this curve is shown as being zero potential though the above comments should be borne in mind regarding the fact that this means the base to emitter voltage is zero not that the base voltage with respect to ground is zero.

Capacitor $C_1$ is seeking to discharge itself to ground potential through resistor $R_1$ and so after a time the base to emitter voltage becomes substantially zero or slightly negative, this being indicated as point 2 on curve A. When this occurs transistor $V_1$ is switched on and current starts to flow from the battery $E_1$ through $L_3$ and $R_3$, through the transistor $V_1$ from the emitter to the collector and thence to the secondary winding of the blocking oscillator transformer $T_1$. This secondary current flow induces a negative potential in the primary winding of the transformer $T_1$ which is reflected through the capacitor $C_1$ to the base of transistor $V_1$ causing a corresponding increase in the emitter-collector current.

Thus in the usual fashion there is a rapid buildup of current through the input winding of transformer $T_1$ which causes a rapid buildup in the negative voltage appearing at the feedback winding which is of course reflected at the base. This is shown as portion 3 of curve A where the base to emitter voltage drops rapidly until point 4 is reached on this curve when the base to emitter voltage levels out.

At point 4 a limiting condition is reached when the rate of increase of current flow through the secondary winding of $T_1$ reaches a limiting value due to the back e.m.f. induced in this winding. It is to be emphasized that it is the rate of change of current which reaches a generally limiting value not the current itself. This means that there is induced in the primary winding a substantially constant negative voltage due to the substantially constant rate of current buildup in the secondary winding. This occurs in portion 5 of curve A which however, it will be noted, does not remain constant but rather increases slightly until point 7 is reached on this curve. This increase in value of the base to emitter voltage (though the base always remains negative with respect to the emitter) is due to the charging of blocking capacitor $C_1$ which takes place while the transistor $V_1$ is conducting. Though the negative potential produced at the feedback winding remains generally constant $C_1$ is charging during this period and thus progressively less of this negative potential is passed along to the base of transistor $V_1$, since the potential of the base is given by the induced negative potential minus the potential being built up on capacitor $C_1$. As this accumulated potential is constantly increasing the voltage transmitted to the base is similarly becoming less and less negative.

The charging of capacitor $C_1$ is shown in curve B of FIGURE 7 where from point 2 until point 8 the charging potential curve shown as the portion 6 of curve B increases steadily with respect to time.

The next event that occurs is that the field of transformer $T_1$ becomes saturated and when this happens the rate of current buildup in the input winding starts to fall off as shown at point 7 on curve A. When the rate of change of current in the input winding falls the induced voltage in the feedback winding falls; this in turn causes the current to fall in the input winding and a cumulative condition is reached whereby the transistor rapidly becomes cut-off, and the electro-magnetic field built up in the transformer $T_1$ collapses.

The collapse of the field induces a large positive going pulse $Y_1$ of curve A, which rises rapidly through a portion 9 to a peak 10 and then falls again through a portion 11. In the absence of any other effects this pulse would produce a generally sinusoidal output swing in the transformer windings due to the interwinding capacitance, and so in the absence of any other effect the negative going portion 11 of pulse $Y_1$ would drive the base appreciably negative with respect to the emitter; the voltage swing being about a reference level which is given by the potential on $C_1$.

However when the base to emitter voltage passes through the zero reference line the transistor $V_1$ again commences to conduct and the previous conditions recur with the base to emitter voltage reaching a substantially constant value at point 16 and then rising slightly over portion 17 due to the charging of capacitor $C_1$, though for reasons given below point 16 is not so negative as point 4.

Considering now the charging curve B for the potential of $C_1$ during the above process; the charging ceases when the transistor becomes cut off at point 8 on curve B. Thereafter the capacitor discharges through resistor $R_1$ but, since the values of $C_1$ and $R_1$ are so chosen that the discharging time constant for the capacitor through resistor $R_1$ is long, then, as shown in the portion 12 of curve B the capacitor only loses a very small portion of its charge during this discharge portion which continues until point 14 is reached on curve B when the transistor again commences to conduct and the capacitor again starts to charge up as is shown in portion 15 of this curve.

This process repeats itself with successive pulses $Y_1$, $Y_2$, $Y_3$ etc., being generated from the blocking oscillator, whose behaviour is thus different from the conventional blocking oscillator in that it does not remain shut off after generating one pulse but continues to pulse and thus generate a train of pulses.

However due to the steadily accumulating charge on capacitor $C_1$ the negative going portions 17, 18, 19 of succeeding pulses $Y_1$, $Y_2$ and $Y_3$ are driven less and less negative and correspondingly the induced feedback winding voltage due to the input winding current is less as is the magnetic field strength. This means there is a progressive decrease in the amplitude of the pulse peaks and also the negative going swing of the various pulses is lessened for successive pulses due to the reduction in the field strength.

The process continues until for one pulse shown here as pulse $Y_4$ the effect of capacitor $C_1$ has made itself felt to such an extent that the negative going swing following pulse $Y_4$ does not go sufficiently negative to switch on transistor $V_1$ due to the large buildup of potential on capacitor $C_1$ which has now reached the value shown at point 21. After two minor ringing pulses $Y_5$ and $Y_6$ the base to emitter voltage settles down to a substantially constant value 23 considerably above zero. Capacitor $C_1$ meanwhile discharges slightly from its value 22 to the same value as the curve for the base to emitter voltage since now the base voltage with respect to the emitter is the same as the voltage present on capacitor $C_1$ with respect to the base.

Figure 8:
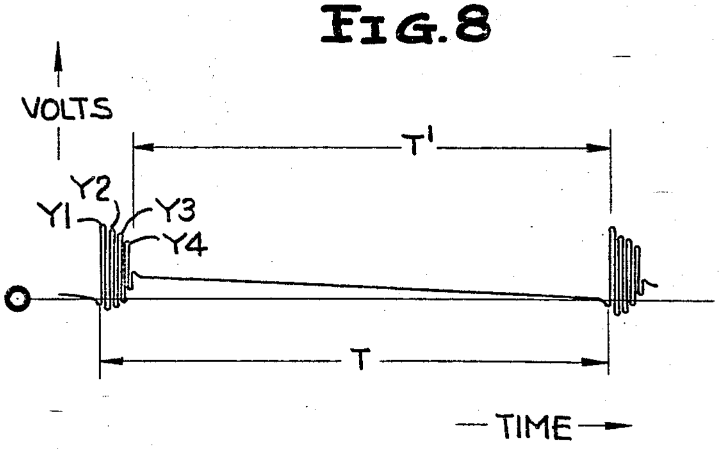
FIGURE 8 shows on an extended time scale the output wave form curve C of the base to emitter voltage.

Turning now to FIGURE 8 the train of pulses $Y_1$, $Y_2$, $Y_3$, etc., are shown as a group at the beginning of curve C of this figure. At the termination of the pulsing action producing this train of pulses, the blocking capacitor $C_1$ commences a relatively slow discharge through resistor $R_1$ until the base to emitter voltage again becomes substantially zero when the transistor again commences the blocking oscillator action. This as shown in FIGURE 8, occupies a period of time T′ which is long compared with the time during which the pulses are being generated, or alternatively T′ may be regarded as occupying most of the interval T between pulse trains.

It should be noted in connection with FIGURE 8 the same reference level is used as for FIGURE 7 that is that the capacitor $C_1$ is shown charged with respect to the base of the transistor. This reference level is actually at potential of the battery $E_1$ above ground, for example if the potential of battery $E_1$ is 16 volts, capacitor $C_1$ could be charged up to a value of some 13 volts or 14 volts positive with respect to the emitter, or about 30 volts with respect to ground.

It will now be appropriate to consider the factors which influence the operation of this circuit as thus far described and these will be apparent from the above description. The number of pulses produced during the blocking oscillator cycle will of course be primarily dependent on the rate at which $C_1$ charges through transistor $V_1$ and this is given by the time constant $C_1 \times (R_3 +$ the emitter to base resistance of transistor $V_1)$. The interpulse interval is controlled primarily by the transformer and its associated load impedance since the time of the pulse is controlled by the time taken for the field to collapse and this is dependent upon these two factors. The interval between pulse trains is governed by the time taken to discharge capacitor $C_1$ through $R_1$ so that in FIGURE 8 T′ is controlled by the time constant $C_1R_1$, and since time T, for the reasons given above is essentially equal to time T′ the pulse train recurrence frequency is controlled by $C_1R_1$.

Thus the number of pulses and the interval between the pulse trains can be readily controlled and the interpulse interval can also be controlled by the judicious selection of transformer design and load impedance.

The remaining factor which cannot so far be controlled independently is the pulse width since with the circuit described up to now this can only be regulated by varying the transformer design, which also affects the interpulse interval.

As mentioned above the pulse width can be controlled by the pulse shaping capacitor $C_2$ and its associated discharge resistor $R_4$ and the action of this pulse shaping capacitor will now be described in connection with FIGURE 4 wherein the discharge resistor $R_4$ is connected in parallel with the oscillator triode. The wave forms for such a configuration are shown in FIGURE 9 where the solid curve represents the voltage induced in the output winding due to the pulses $Y_1$, $Y_2$, $Y_3$ etc. generated by the blocking oscillator; the dashed curve E represents the voltage appearing across capacitor $C_2$ due to this output winding voltage and the dot-dash curve F represents the voltage applied to the plate of the oscillator triode.

Figure 9:
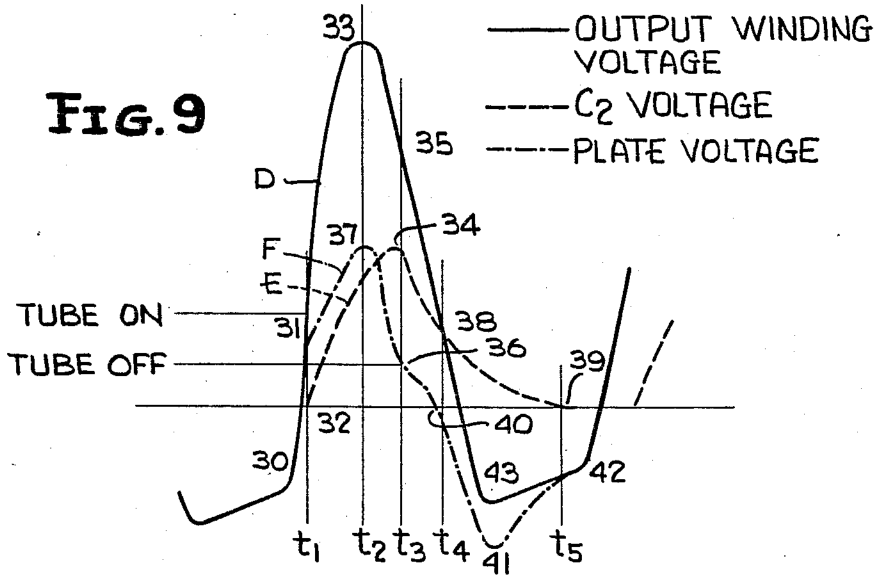
FIGURE 9 shows the various voltages, curves D, E and F respectively in the output circuit with the $C_2$ discharge resistor across the load.

Due to the output winding being wound 180 degrees out of phase with the input winding and due to the high output to input winding ratio a high peak voltage pulse is induced in the output winding, so that each of the pulses $Y_1$, $Y_2$, $Y_3$ etc. produces a very large positive going pulse in the output winding a typical one of which is shown in FIGURE 9 by the solid curve D.

As will be appreciated from a consideration of FIGURE 4 when this positive going voltage first appears, shown as portion 30 of curve D of FIGURE 9, the voltage appearing across the triode oscillator is not sufficient to cause it to conduct and so the tube remains cut off presenting a high impedance in parallel with $R_4$. $C_2$ thus charges but slightly during this portion of the curve until point 31 is reached at time $t_1$ when the tube starts to conduct and rapidly becomes a relatively low impedance in parallel with resistor $R_4$. At this instant shown as point 32 on curve E the pulse shaping capacitor $C_2$ starts to charge and does so rapidly due to the low time constant of the charging path. Prior to this the potential induced in the output winding had been almost entirely applied across the triode. However when $C_2$ commences to charge the output winding voltage is not all applied to the triode due to the charging potential being accumulated on capacitor $C_2$ and so the plate potential on the triode oscillator, shown as curve F of FIGURE 9, increases but slightly whilst the capacitor is charging.

After a while at time $t_2$ the curve D levels off when the peak point 33 for this curve is reached. If the output winding potential were to remain constant at the value given by point 33, capacitor $C_2$ would in time charge up to this value and no voltage would be left across the triode which would then of course shut off giving an equilibrium condition with $C_2$ fully charged to the output winding voltage level.

However this is not the case. The output winding voltage commences to drop rapidly as shown in portion 35 of curve D. However since the applied voltage is still above that achieved by capacitor $C_2$ this capacitor still charges but at a much slower rate producing a flattened portion 34 in the capacitor charging curve E. At time $t_3$ the triode oscillator plate voltage, which is the difference between the output winding voltage and the voltage on capacitor $C_2$, becomes too low to sustain conduction of the triode oscillator which then switches off. This drop in plate voltage is shown as occurring between points 37 and 36 on the curve F of FIGURE 9. Over the portion of the curve between these two points capacitor C has a slight increase in potential while the applied voltage is falling rapidly so that there is a rapid fall in the voltage applied to the triode oscillator which then cuts off at time $t_3$.

At time $t_3$ capacitor $C_2$ commences to discharge through resistor $R_4$ down to ground potential. As the applied voltage curve from the output winding D is still falling rapidly the voltage appearing across the triode, which is the difference of the other two voltages continues to fall even though the triode is shut off. At point 38 common to curves E and D the output winding voltage has fallen to a point where it is the same as the voltage on the capacitor $C_2$ this occurring at time $t_4$. At this point 40 therefore the curve F of the plate voltage must pass through the zero reference line. Beyond this point the applied voltage curve becomes negative until point 43 is reached when the transistor $V_1$ is again conducting and a limiting value of current has been reached in the secondary winding in the manner described above. Capacitor $C_2$ voltage is now added to this negative voltage producing an increased negative voltage in curve F which reaches a low at point 41 of this curve. Capacitor $C_2$ then carries on discharging until at time $t_5$ point 39 is reached when it is fully discharged which corresponds to point 42 on curve F when the plate voltage becomes only the negative voltage due to the negative voltage induced in the output winding of the blocking oscillator transformer.

The overall effect of introducing capacitor $C_2$ into the output winding is therefore to narrow the width of the output pulse from the triode oscillator since due to the lag in the capacitor charging it cannot accumulate charges as quickly as the applied voltage would require it to do if it were to follow the voltage charging curve exactly and so the voltage buildup across the triode is more rapid and similarly on the discharging portion of this curve the capacitor tends to maintain its voltage thus reducing the voltage available for the triode oscillator and correspondingly narrowing the output pulse.

Thus control of the pulse width is possible by judicious selection of pulse shaping capacitor $C_2$ and discharge resistor $R_4$, though it should be pointed out that the charging time constant for capacitor $C_2$ must be quite short so as to permit the capacitor to acquire an appreciable charge during the charging portion of the output pulse and similarly the discharging time constant must also be short to permit the relatively rapid discharge of this capacitor.

Figure 10:
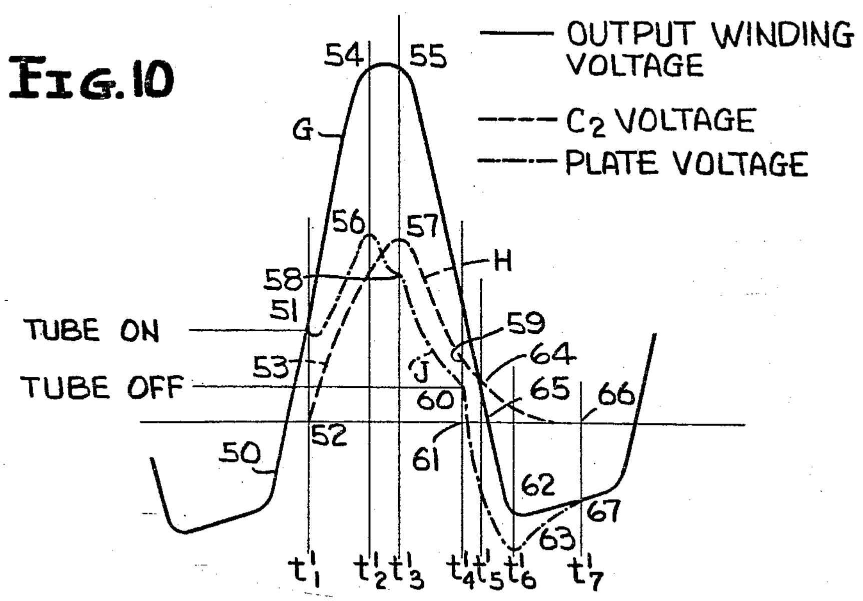
FIGURE 10 shows the same form of curves, viz, curves G, H and J respectively when the discharge resistor is across $C_2$.

As mentioned above the other method of providing a discharge path for the pulse shaping capacitor $C_2$ is to introduce a discharge resistor $R_4$ across this capacitor in the manner shown in FIGURE 5. The resulting wave form patterns are shown in FIGURE 10 where the solid curve G represents the output winding voltage the dashed curve H represents $C_2$ charging potential and the dot-dashed curve J is the plate voltage appearing across the triode oscillator.

As before the operation may be considered commencing with the rapidly rising portion 50 of curve G. Since the triode is not conducting all of this voltage appears across the triode which is effectively an infinite impedance. At point 51 on curve G the voltage reaches a value sufficient to cause the tube to conduct and the plate resistance of the tube quickly drops as current begins to flow through the tube and $C_2$ starts to charge up commencing at time $t_1$ shown as point 52 on curve J.

The operation of the charging portion of the curves may be most readily understood by considering capacitor $C_2$ as a variable impedance whose resistive component varies exponentially between zero and infinity as the capacitor charges. Thus at the time the triode oscillator commences to conduct the capacitor $C_2$ is virtually a short circuit and the whole of the applied potential is across the plate circuit of the triode oscillator shown as points 51 and 52 at time $t_1'$ on curves G, J and H respectively. $C_2$ commences to charge exponentially during the portion 53 of curve H. The applied voltage is then divided between the impedance represented by the plate resistance of the tube, which settles down to a substantially constant value and the rapidly increasing resistance represented by the $C_2R_4$ combination. The applied voltage is rapidly rising and so both the capacitor and the plate voltage rise rapidly but due to the varying nature of the capacitor impedance and its positive time constant it lags the applied voltage which means that more voltage is presented to the plate circuit.

At time $t_2'$ curve G reaches a limiting point 54 where the applied potential becomes substantially constant and in the natural course of events if this applied voltage was to remain constant at this level an equilibrium condition would in time be reached with $C_2$ fully charged when the applied voltage would be divided between $R_4$ and the plate resistance in due proportion relative to their respective impedance values. However due to the fact that the $C_2$ charging potential always lags slightly behind the applied voltage this equilibrium condition would not be reached until some time after the applied voltage had reached its constant value and accordingly the plate voltage must rise to a value above its limiting value and then fall to the equilibrium level.

This manifests itself as a peak 56 in curve J which then falls to a lower value 58 at time $t_3$ when the capacitor $C_2$ has charged up to a value represented by point 57 on curve H, the applied voltage still being constant at point 55. Here substantially equilibrium conditions have been achieved with the voltages on the $C_2R_4$ combination network and the plate of the triode oscillator being related generally in the ratio of their respective impedances.

The next step is that the applied voltage starts to fall rapidly and the voltage across the $C_2R_4$ network and the plate circuit seek to follow in accordance with the proportions dictated by their respective resistive components. However due to the presence of capacitor $C_2$ the voltage across $R_4$ cannot fall as rapidly as it would if it was to follow the discharging portion of the applied voltage curve exactly and thus curve H decays generally exponentially down to point 59 thereby maintaining the voltage across $C_2$ and $R_4$ at a value higher than it would be if this were only a pure resistance. With a higher voltage being maintained on capacitor $C_2$ a lower voltage must be present on the plate circuit and thus a scoop depicted in the portion of curve J between points 58 and 60 is taken out of the plate voltage representing a narrowing of the plate circuit pulse.

At time $t_4'$ the plate voltage has dropped to point 60 which does not represent a sufficiently high potential to continue the oscillations in the triode oscillator which therefore cuts off. This removes one of the discharge paths for capacitor $C_2$ which can now only discharge through its associated discharge resistor $R_4$ so that at point 59 on the capacitor discharging curve H there is a shallowing effect noticeable due to the increase in the time constant of the capacitor discharge path and this reflects itself in a levelling out of the plate voltage curve between points 60 and 61.

At time $t_5'$ point 64 on curves H and G is reached where the applied voltage is equal to the capacitor voltage so that the plate voltage is zero as at point 61. Thereafter the applied voltage becomes negative and supplements the negative voltage being applied to the plate from the capacitor $C_2$ so that the negative plate voltage is further lowered to a value 63 at time $t_6'$ where it is appreciably below that present on the output winding which is represented by the value shown at point 62 on curve G.

Thereafter as the capacitor potential decays exponentially to zero at point 66 on curve H the plate voltage rises until at point 67, at time $t_7'$ the voltage on the capacitor is zero and the plate voltage which is negative and of course does not cause the tube to conduct, is equal to the voltage present at the output winding.

Capacitor $C_2$ when discharging is, of course, feeding a discharging current through the output winding of transformer $T_1$. This discharging current tends to accelerate the collapse of the magnetic field, and thus supplements the negative drive voltage induced in the feedback winding, and adding appreciably to the negative overshoot of the output winding voltage. This additional induced voltage means the base is driven more negative with respect to the emitter on each successive pulse, which in practical terms means that more pulses of greater amplitude can be obtained from the blocking oscillator.

Thus as for the series discharge resistor case the effect of having $R_4$ in parallel with $C_2$ is to sharpen the leading edge of the plate voltage pulse and to steepen the trailing edge of the pulse, giving the dual benefits of a more nearly rectangular output pulse and control over the pulse width.

In a typical circuit the following components were used.

| | |
|---|---|
| $V_1$ | Minneapolis-Honeywell H5 transistor (pnp). |
| $E_1$ | 16 volt battery. |
| $C_1$ | Two microfarads. |
| $C_2$ | 200 micromicrofarads. |
| $R_1$ | 27 kilohms. |
| $(R_2)$ | The load impedance approximately 10 kilohms. |
| $R_3$ | 5 ohms. |
| $R_4$ | 47 kilohms. |

The blocking oscillator transformer $T_1$– D-36/22 111$B_1$ Ferroxcube core, has a winding ratio of 1:1:20 with the output winding being reversed wound so that its output voltage has 180 degrees out of phase that of the input.

With above values the pulse group recurrence frequency was 65 cycles per second so that the pulse group interval T was .0154 second. The pulse width was 7 microseconds and the interpulse interval was 70 microseconds.

An important practical quality of the $C_2R_4$ combination is that it acts as a filter network since due to its small value $C_2$ has a high impedance to low frequencies and a low impedance to high frequencies. In order to keep the pulse applied to the plate of the triode oscillator as pure and as sharp as possible it is desirable to remove any low frequency components appearing in the output of the output winding of the blocking oscillator transformer from being presented to the triode oscillator.

This is accomplished by the filtering effect of the $C_2R_4$ combination because for the low frequency components the impedance of this combination is high so that virtually all of the voltage generated at these low frequencies appears across $C_2$ due to the voltage dividing action of this high impedance and the low plate circuit impedance in series with it, so that most of the voltage appears across the triode oscillator thus filtering from the oscillator those low frequency components which would distort the plate modulation voltage wave from and hence the pulse output from the triode oscillator.

Figure 6:
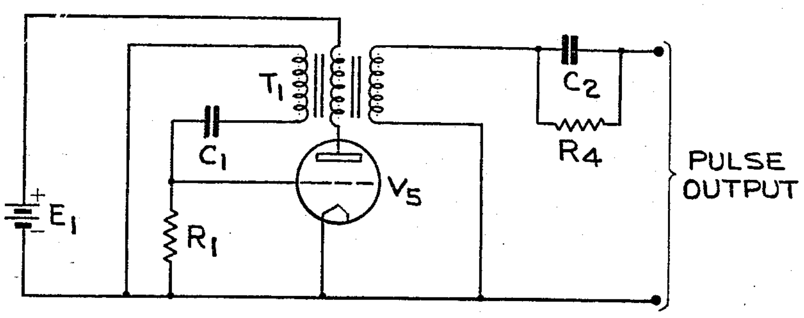
FIGURE 6 shows how the circuit would be formed utilizing an electron tube instead of the transistor of the previous figures.

So far no mention has been made of the circuit shown in FIGURE 6 which utilizes an electron tube in place of the transistor in the blocking oscillator portion of the circuit. This is because equivalent tube circuits can be devised by any of the well-known methods of deducing equivalent circuits between those using tubes and those using transistors. Such methods are, for example, described in "Transistor Electronics," published as part of the Prentice-Hall Electrical Engineering Series, edited by W. L. Everitt.

Tube circuits can thus readily be devised which are analogous to the transistor circuits described above and the use of such circuits is envisaged within the scope of the present invention, and their mode of operation is similar. For obvious reasons the tube carries a penalty in the form of higher weight and increased power requirements, so it is not very suitable for the preferred distress transmitter embodiment of the present invention.

I claim:

1. A self-quenching, self-triggering blocking oscillator for providing spaced trains of pulses of at least two pulses each to be applied to a user circuit having a principally resistive, and short time constant, input impedance comprising:

(i) a blocking oscillator transformer having:
  (a) an input winding,
  (b) a feedback winding, and
  (c) an output winding adapted to feed said user circuit, each of said windings having first and second ends, the said second ends being joined together, (ii) a transistor having;
  (a) an emitter electrode,
  (b) a collector electrode, and
  (c) a base electrode, said collector electrode being connected to the said first end of the said input winding, (iii) a blocking capacitor connected to said first end of said feedback winding and to said base electrode, (iv) a first discharge resistor connected to said base electrode and to said second ends of the said transformer windings, (v) a pulse-shaping capacitor connected in series with the first end of the said output winding and the said input impedance of the user circuit, (vi) a second discharge resistor having one end thereof connected to the junction of said input impedance and said pulse-shaping capacitor and the other end thereof connected in a manner to discharge said pulse-shaping capacitor rapidly when discharging current flows into said user circuit, (vii) a voltage source, one pole of which is connected to the said second ends of said transformer windings, and (viii) a resistance choke connected between said transistor emitter electrode and the other pole of said voltage source, said blocking capacitor being such as to cause said oscillator to block after generating a pulse train due to the accumulated charge on said blocking capacitor; said first discharge resistor being such as to provide a discharge path for said blocking capacitor when said oscillator is blocked by said accumulated charge, the values of said blocking capacitor and said discharge resistor being such that the time constant of said discharge path is long compared to the time constant of the charging path of said blocking capacitor when receiving said charge; said pulse-shaping capacitor having such a value as to cause said pulse-shaping capacitor to charge rapidly when a charging current flows into said user circuit; said second discharge resistor being such as to discharge said pulse-shaping capacitor rapidly when discharging current flows into said user circuit.

2. A pulse generating and shaping circuit according to claim 1 wherein said user circuit is an oscillator and said input impedance comprises the plate modulation circuit of said oscillator.

3. A pulse generating and shaping circuit according to claim 1 wherein said second discharge resistor is connected across said pulse shaping capacitor.

4. A pulse generating and shaping circuit according to claim 1 wherein said second discharge resistor is connected in parallel with said input impedance.

5. A plate modulation circuit for a mobile vacuum tube transmitter comprising a self-quenching self-triggering blocking oscillator including a source of electrical power, a transistor having emitter, collector and base electrodes, said emitter electrode being connected to one pole of said source, a first discharge resistor connecting said base electrode to another pole of said source; a blocking oscillator transformer having feedback, input and output windings, a blocking capacitor connecting one end of said feedback winding to said base electrode, the other end of said feedback winding being connected to said other pole of said source; said input winding having one end connected to said collector electrode and the other end connected to said other pole of said source, the values of said blocking capacitor and said first discharge resistor being so selected that the charging time constant of said blocking capacitor when said transistor is conducting is appreciably less than the discharging time constant of said blocking capacitor through said first discharge resistor when said transistor is not conducting; a pulse shaping capacitor connecting said output winding in series with the oscillator section of said mobile transmitter, and a second discharge resistor connected to said pulse-shaping capacitor in such a manner as to provide a low time constant discharge path for said pulse shaping capacitor.

6. A plate modulation circuit according to claim 5 wherein said charging time constant of said blocking capacitor is so selected that said blocking capacitor does not receive sufficient charge during the first blocking pulse of said blocking oscillator to block said blocking oscillator whereby to cause the output of said blocking oscillator to be a train of at least two pulses before said capacitor charges sufficiently to block said oscillator.

7. A plate modulation circuit according to claim 5 wherein said second discharge resistor is connected in parallel with said pulse shaping capacitor.

8. A plate modulation circuit according to claim 5 wherein said second discharge resistor is connected in parallel with said oscillator section of said mobile transmitter.

References Cited in the file of this patent

UNITED STATES PATENTS

| | | |
|---|---|---|
| 1,621,034 | Slepian | Mar. 15, 1927 |
| 2,484,209 | Duffy | Oct. 11, 1949 |
| 2,558,343 | Cosby | June 26, 1951 |
| 2,841,700 | Hallden | July 1, 1958 |
| 3,001,091 | Kaiser et al. | Sept. 19, 1961 |

OTHER REFERENCES

Publication, Waveforms by Chance, Hughes, MacNichol, Sayre and Williams, McGraw-Hill Book Co., 1949, page 221.